US012374316B2

(12) United States Patent
Lin

(10) Patent No.: US 12,374,316 B2
(45) Date of Patent: Jul. 29, 2025

(54) SEPARATE ACTIVE NOISE CANCELLATION DEVICE

(71) Applicant: TAIWAN MICROLOOPS CORP., New Taipei (TW)

(72) Inventor: Chun-Hung Lin, New Taipei (TW)

(73) Assignee: TAIWAN MICROLOOPS CORP., New Taipei (TW)

( * ) Notice: Subject to any disclaimer, the term of this patent is extended or adjusted under 35 U.S.C. 154(b) by 151 days.

(21) Appl. No.: 18/207,115

(22) Filed: Jun. 7, 2023

(65) Prior Publication Data

US 2024/0355314 A1 Oct. 24, 2024

(30) Foreign Application Priority Data

Apr. 21, 2023 (TW) ................................ 112114971

(51) Int. Cl.
*G10K 11/16* (2006.01)
*G10K 11/178* (2006.01)

(52) U.S. Cl.
CPC .... *G10K 11/1785* (2018.01); *G10K 11/17881* (2018.01)

(58) Field of Classification Search
CPC ...................... G10K 11/1785; G10K 11/17881
USPC ................................................ 381/71.1, 71.3
See application file for complete search history.

(56) References Cited

U.S. PATENT DOCUMENTS

2009/0195922 A1* 8/2009 Urmanov ............. G11B 25/043 360/97.19
2010/0002890 A1* 1/2010 Lyon ................ G10K 11/17881 381/71.5
2024/0284124 A1* 8/2024 Ma ......................... H04R 25/43

FOREIGN PATENT DOCUMENTS

TW M644561 U 8/2023

OTHER PUBLICATIONS

Office Action dated Dec. 6, 2023 of the corresponding Taiwan patent application No. 112114971.

* cited by examiner

*Primary Examiner* — Ammar T Hamid
(74) *Attorney, Agent, or Firm* — Chun-Ming Shih; hdls ipr services

(57) ABSTRACT

A separate active noise cancellation device is installed on an electronic device which includes a circuit board and a noise generating source. The separate active noise cancellation device includes an active noise cancellation controller, a microphone and a speaker, the active noise cancellation controller is installed on and electrically connected to the circuit board, the microphone and the active noise cancellation controller are separately installed, the microphone has a cable provided for electrically connecting the active noise cancellation controller, the microphone is arranged around the noise generating source, the speaker is electrically connected to the active noise cancellation controller and capable of issuing a noise cancelling sound to offset the noise generated by the noise generating source. In this way, the amount of noise may be accurately captured and reduced to overcome the annoying noise problem.

8 Claims, 6 Drawing Sheets

SEPARATE ACTIVE NOISE CANCELLATION DEVICE

BACKGROUND OF THE DISCLOSURE

Technical Field

The technical field relates to a noise cancellation device, and more particularly relates to a separate active noise cancellation device.

Description of Related Art

As display cards, power supply units, host computers and other electronic devices significantly improve their function and computing power, the problem of heat generated by the processor of the electronic devices such as central processing unit (CPU) and graphic processing unit (GPU) arises and waits for feasible solutions.

At present, most of the aforementioned electronic devices use air cooling or gas cooling in the heat dissipation design to dissipate heat. A common method is to blow away the heat generated by the heat source through a fan to achieve the heat dissipation effect, and this is the simplest and most economical way to provide a large amount of air flow by controlling fan speed, but this method also produces relatively large noise.

Therefore, how to overcome the noise problem is a technical issue that the present disclosure intends to solve.

SUMMARY OF THE DISCLOSURE

It is a primary objective of this disclosure to provide a separate active noise cancellation device with a separate configuration of an active noise cancellation controller and a microphone, such that the microphone is closer to a noise generating source to accurately capture and reduce the amount of noise, so as to overcome the annoying noise problem.

To achieve the aforementioned and other objectives, this disclosure discloses a separate active noise cancellation device, which is installed on an electronic device including a circuit board and a noise generating source. The separate active noise cancellation device includes an active noise cancellation controller, a microphone and a speaker, the active noise cancellation controller is installed on the circuit board and electrically connected to the circuit board, the microphone and the active noise cancellation controller are arranged separately, the microphone has a cable provided for electrically connecting the microphone to the active noise cancellation controller, the microphone is situated around the noise generating source, and the speaker is electrically connected to the active noise cancellation controller and capable of issuing a noise cancelling sound to offset the noise generated by the noise generating source.

DETAILED DESCRIPTION

The technical contents of the present disclosure will become apparent with the detailed description of embodiments accompanied with the illustration of related drawings as follows. It is intended that the embodiments and drawings disclosed herein are to be considered illustrative rather than restrictive.

Figure 1:
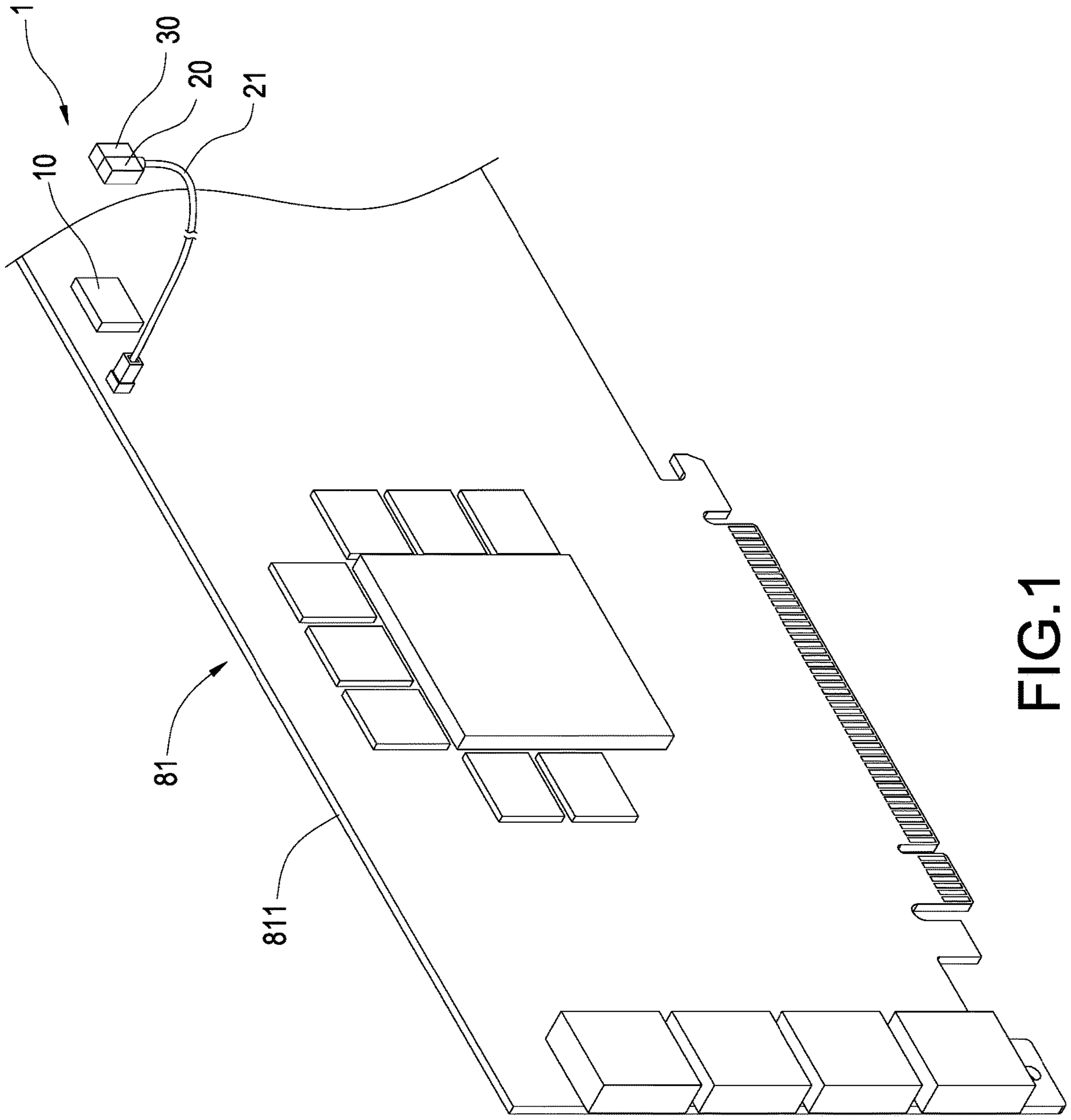
FIG. 1 is a perspective view of a separate active noise cancellation device of this disclosure applied to a display card.
Figure 2:
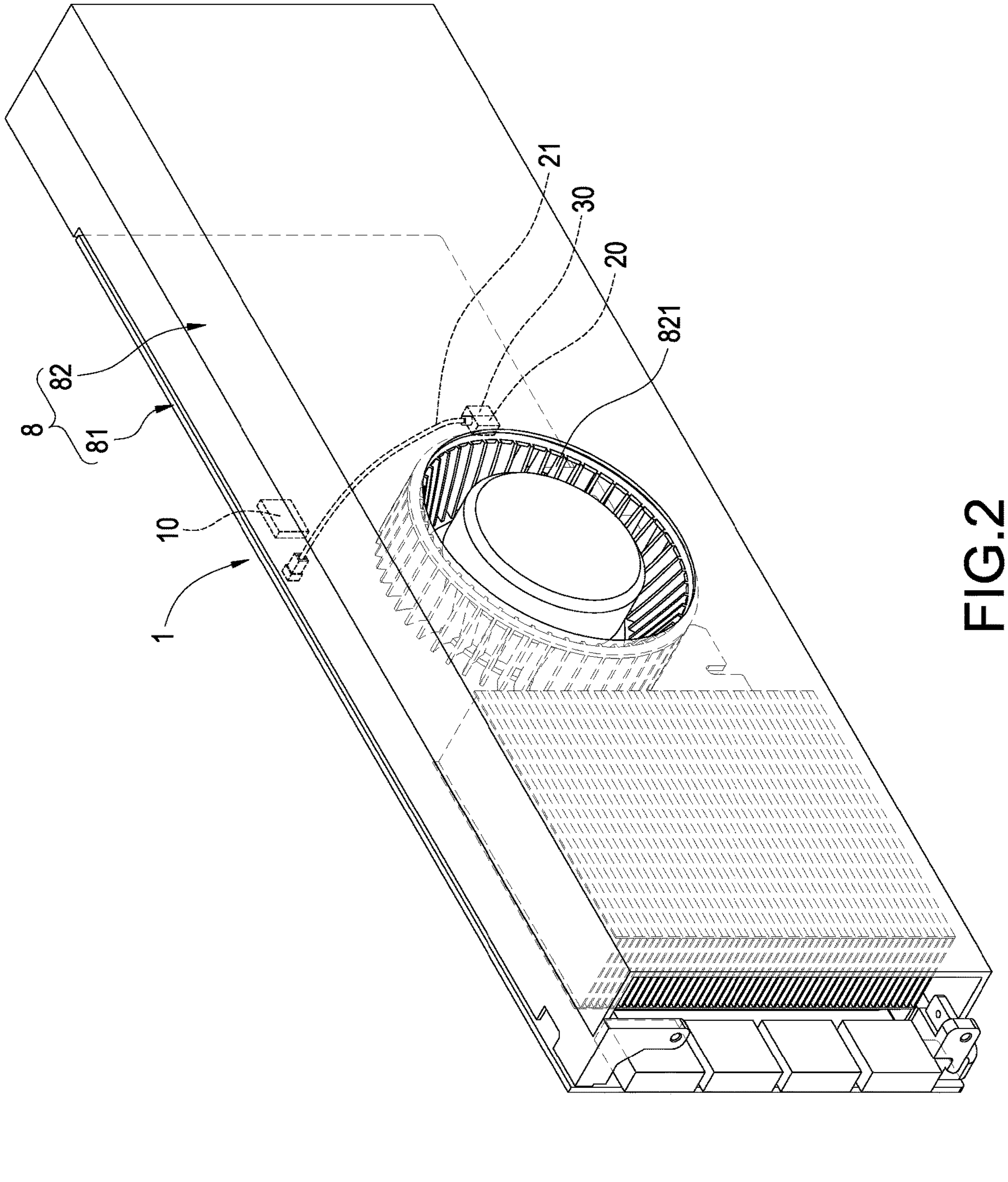
FIG. 2 is a perspective view of the separate active noise cancellation device as depicted in FIG. 1, which is combined with a cooling device.
Figure 3:
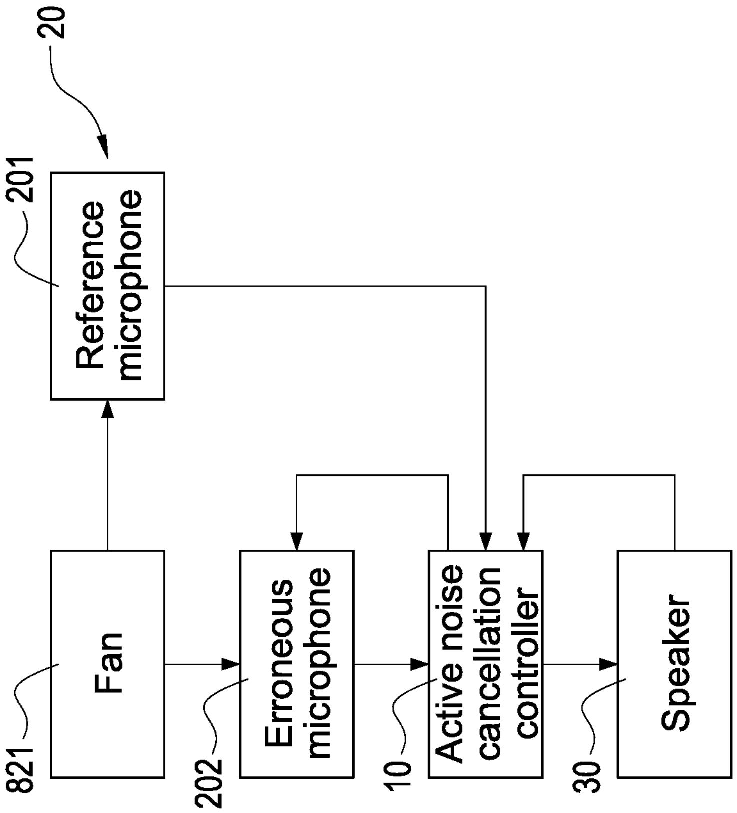
FIG. 3 is a schematic block diagram of a separate active noise cancellation device and a fan in accordance with the present disclosure.

With reference to FIGS. 1 to 3 for a separate active noise cancellation device of an embodiment of the present disclosure which is installed on an electronic device 8, the separate active noise cancellation device 1 mainly includes an active noise cancellation controller 10, a microphone 20 and a speaker 30.

In this embodiment, the electronic device 8 mainly includes a display card 81 and a cooling device 82, and the display card 81 has a circuit board 811, and a graphic processor, a plurality of signal ports and a plurality of memories which are installed on the circuit board 811. The cooling device 82 includes a fan 821, a cover and a heat sink, the fan 821 is a noise generating source, the heat sink is attached on a surface of the graphic processor, the fan 821 is formed on a side of the heat sink, and the cover covers on the heat sink and the fan 821.

The active noise cancellation (ANC) controller 10 is installed on the circuit board 811 and electrically connected to a circuit of the circuit board 811. The microphone 20 is arranged separately with the active noise cancellation controller 10 and has a cable (first cable) 21 provided for electrically connecting the microphone 20 to the active noise cancellation controller 10. The microphone 20 is disposed around the fan 821 and mainly includes a reference microphone 201 and an erroneous microphone 202 (as shown in FIG. 3). The speaker 30 is electrically connected to the active noise cancellation controller 10 and capable of generating a noise cancelling sound to offset the noise generated by the noise generating source of the fan 821. In this embodiment, the microphone 20 and speaker 30 are arranged side by side, and the number of microphones 20 and the number of speakers 30 are the same.

In the present disclosure, after the separate active noise cancellation device is combined with a cooling device for operation, the graphic processor generates a large amount of waste heat. By the thermal conduction between the heat sink and the graphic processor and the cold air blowing from the fan 821, the heat dissipation effect is achieved.

In this embodiment, the fan 821 operates according to the fan control signal, the greater the value of the fan control signal, the faster the motor speed in the fan 821, and the stronger the heat dissipation effect. However, it may also generate greater noise. In an embodiment, the fan control signal is a square wave signal of a pulse width modulation (PWM), and the motor speed of the fan 821 is adjusted by changing the duty cycle of the fan control signal. During operation, the noise source of the fan 821 comes from the air flow caused by motor rotation, and the narrow frequency component may come from the thickness noise of the volume displacement generated by the vane movement, or the blade passing frequency (BPF) noise caused by the variable load of the vane surface (with axial lifting force and fan surface pulling force). Since the BPF and related harmonic waves are related to the pressure disturbance generated when each vane passes a fixed reference point, and a specific narrowband noise is generated when the vane tip generates periodic pressure waves. On the other hand, when the air flow passes through the vane, it leaves from the boundary layer of the vane or two sides of the vane tip to form alternating vortices. This phenomenon is called vortex shedding, which makes the instantaneous speed of the fluid different on two sides of the vane. The instantaneous pressures on the two sides of the vane are also different at different fluid velocities, so that the vane may vibrate and generate a specific wideband noise.

In this embodiment, the reference microphone 201 is arranged at a position close to each vane of the fan 821 to capture the noise generated by the fan 821 during operation, and a measured wideband noise signal is sent to the active noise cancellation controller 10. The wideband noise signal includes a wideband noise spectrum of an airflow noise generated by the fan 821 during operation. In an embodiment, the reference microphone 201 is a Micro Electro Mechanical System (MEMS) microphone with the functions of high heat resistance, high vibration resistance, high radio frequency interference resistance, etc. The type of reference microphone 201 does not limit the scope of the present disclosure. The erroneous microphone 202 is provided for capturing the overall noise of each vane of the fan 821 during operation, and output the corresponding error signal to the active noise cancellation controller 10, where the noise signal represents the noise signal to be eliminated during the operation of each vane. Since the fan 821 is the main noise source, the erroneous microphone 202 is arranged near the fan 821, where the distance between the reference microphone 201 and the active noise cancellation controller 10 is greater than the distance between the erroneous microphone 202 and the active noise cancellation controller 10. The erroneous microphone 202 detects the noise through a primary path and a secondary path. The primary path relates to a signal transmission path between the fan 821 and the erroneous microphone 202, and the noise signal is captured through the primary path. The secondary path relates to a signal transmission path between the speaker 30 and the erroneous microphone 202, and a corrected reversed-phase noise signal of the relevant reversed-phase noise signal is captured through the secondary path. Specifically, the error signal outputted by the erroneous microphone 202 is the value of difference between the noise signal and the corrected reversed-phase noise signal, when the value of the error signal is smaller, it represents the noise cancellation effect is better. In an embodiment, the erroneous microphone 202 is a digital MEMS microphone with the functions of high heat resistance, high vibration resistance, high radio frequency interference resistance, etc.

In this embodiment, the active noise cancellation controller 10 receives a synchronous signal, a wideband noise signal from the reference microphone 201, and an error signal from the erroneous microphone 202. The synchronous signal includes the information related to the structure of the fan 821 (such as the number of vanes of each fan) and operation settings (such as the motor speeds at different operation modes). According to the synchronous signal and the wideband noise signal, the active noise cancellation controller 10 calculates the wideband noise in the noise generated by fan 821 during actual operations. According to the synchronous signal and the error signal, the active noise cancellation controller 10 calculates the narrowband noise in the noise generated by the fan 821 during actual operations. According to the calculated wideband noise and narrowband noise, the active noise cancellation controller 10 provides a speaker control signal to drive the speaker 30, so that the reversed-phase noise signal provided by the speaker 30 may effectively offset the noise signal, that is, try to minimize the error signal to zero.

In this embodiment, the speaker 30 is an electronic component that converts an electronic signal into a sound signal, usually including a diaphragm and a driving circuit formed by an electromagnet and voice coil. The speaker 30 provides a speaker control based on the active noise cancellation controller 10 for operations. When the current of the speaker control signal passes through the voice coil, the voice coil vibrates with the frequency of the current, and the diaphragm connected to the voice coil vibrates accordingly to push the surrounding air to vibrate and produce a noise canceling sound. In an embodiment of the present disclosure, the diaphragm of speaker 30 generates a reversed-phase noise signal according to the speaker control signal.

Figure 4:
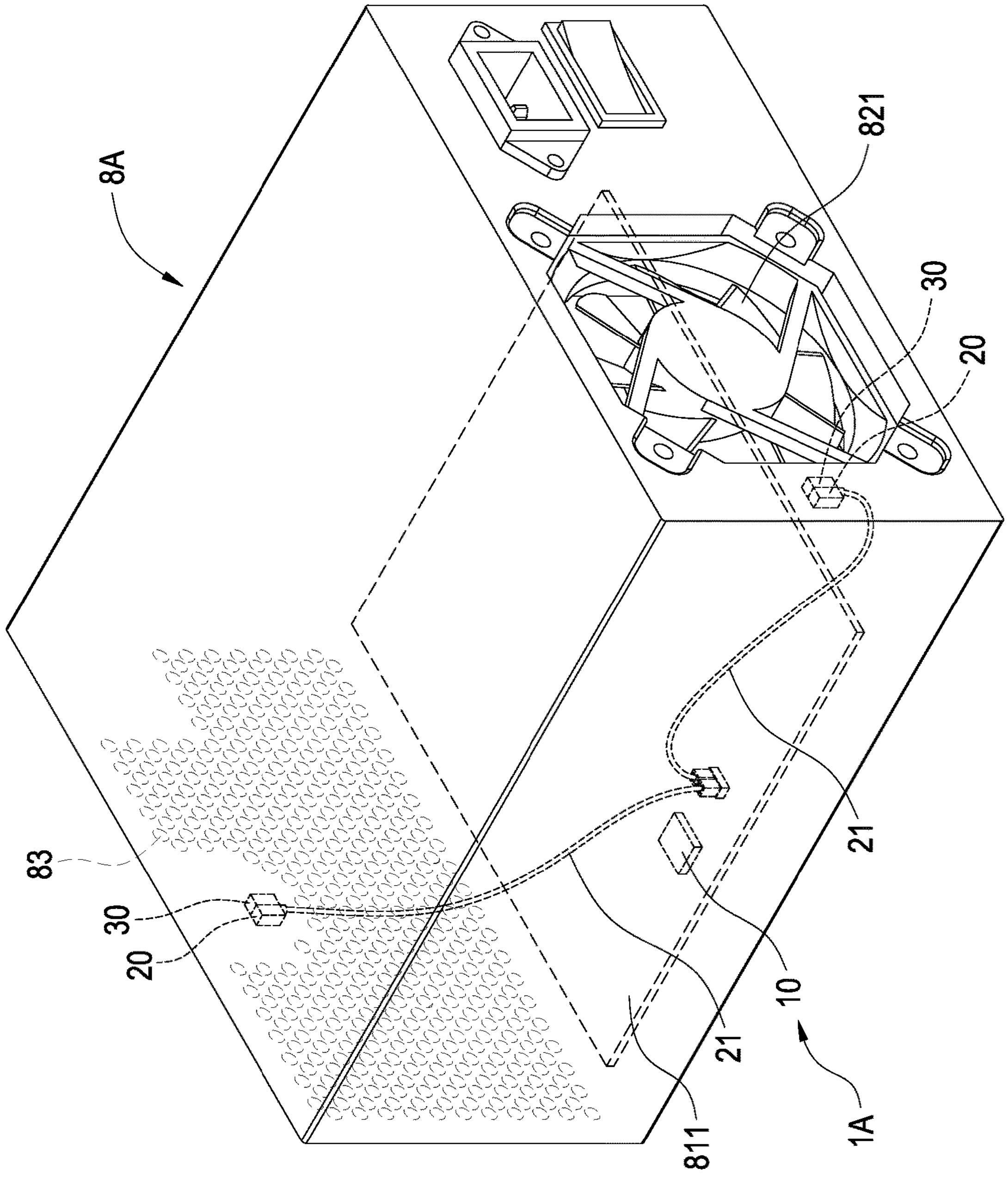
FIG. 4 is a perspective view of a separate active noise cancellation device of the present disclosure which is applied to a power supply unit.

In FIG. 4, the power supply unit of this embodiment is an electronic device 8A and mainly includes a circuit board 811, a fan 821 and a plurality of vent holes 83, and the fan 821 and each vent hole 83 of this embodiment are noise generating sources.

The separate active noise cancellation device 1A of this embodiment also includes a plurality of microphones 20 and a plurality of speakers 30, certain parts of the microphones 20 and speakers 30 are situated around the noise generating source of the fan 821, certain parts of the microphones 20 and speakers 30 are situated around the noise generating source of each vent hole 83.

Figure 5:
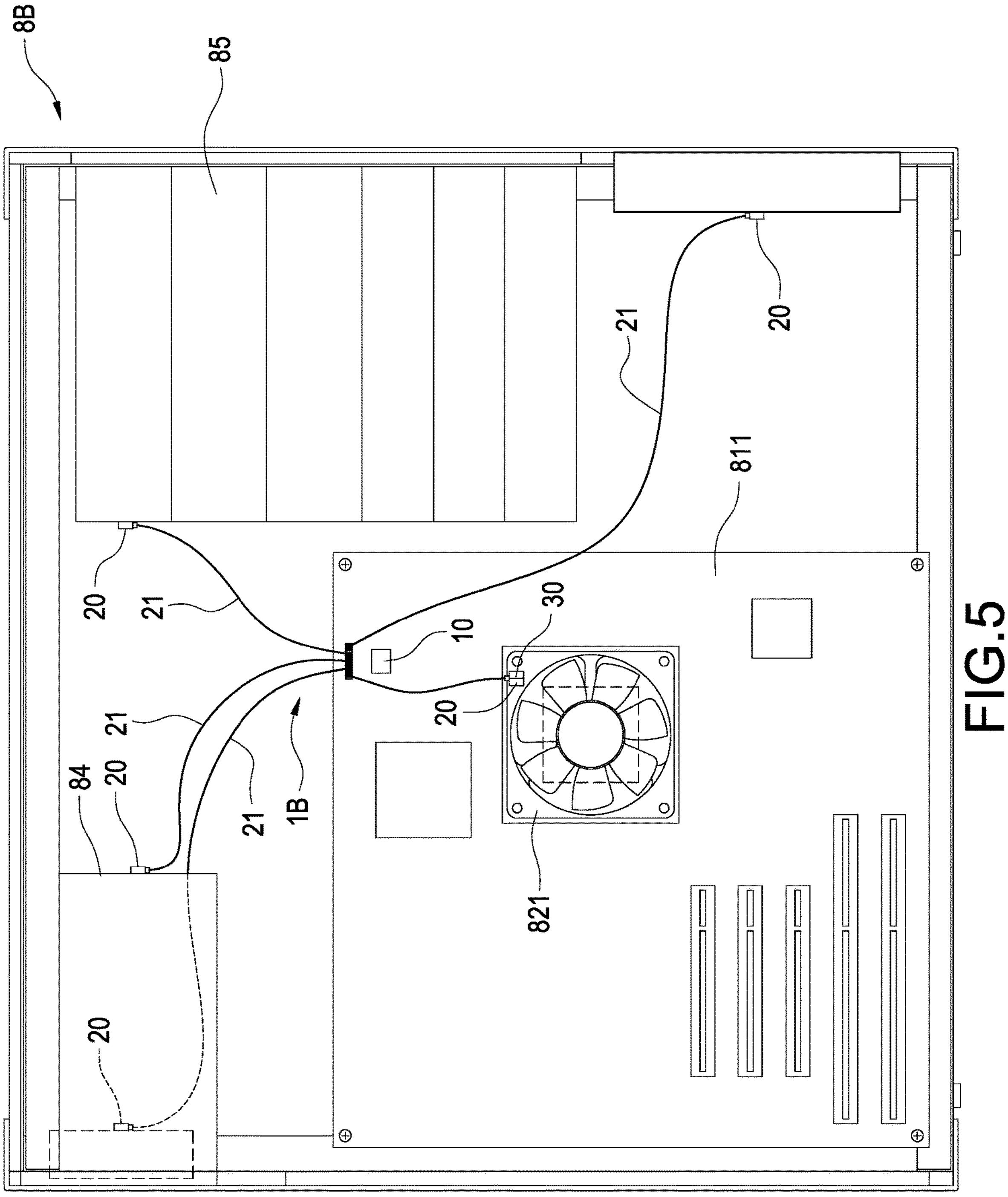
FIG. 5 is a perspective view of a separate active noise cancellation device of the present disclosure which is applied to a host computer and FIG. 6 is a perspective view of a separate active noise cancellation device of another embodiment of the present disclosure which is applied to a display card.

With reference to FIG. 5 for a separate active noise cancellation device 1B in accordance with an embodiment of the present disclosure, the electronic device 8B of this embodiment is a host computer and mainly includes a circuit board 811, a plurality of fans 821, a power supply unit 84 and a plurality of cassette machines 85. Each fan 821, the power supply unit 84 and each cassette data access device 85 of this embodiment are various different noise generating sources.

In this embodiment, the separate active noise cancellation device 1B also includes a plurality of microphones 20 and a plurality of speakers 30, certain parts of the microphones 20 and speakers 30 are situated around the noise generating source of the fan 821 of the central processing unit, other parts of the microphones 20 and speakers 30 are situated around the noise generating source of the fan 821 of the power supply unit 84. Certain parts of the microphones 20 and speakers 30 are situated around the noise generating source of the cassette data access device 85.

Figure 6:
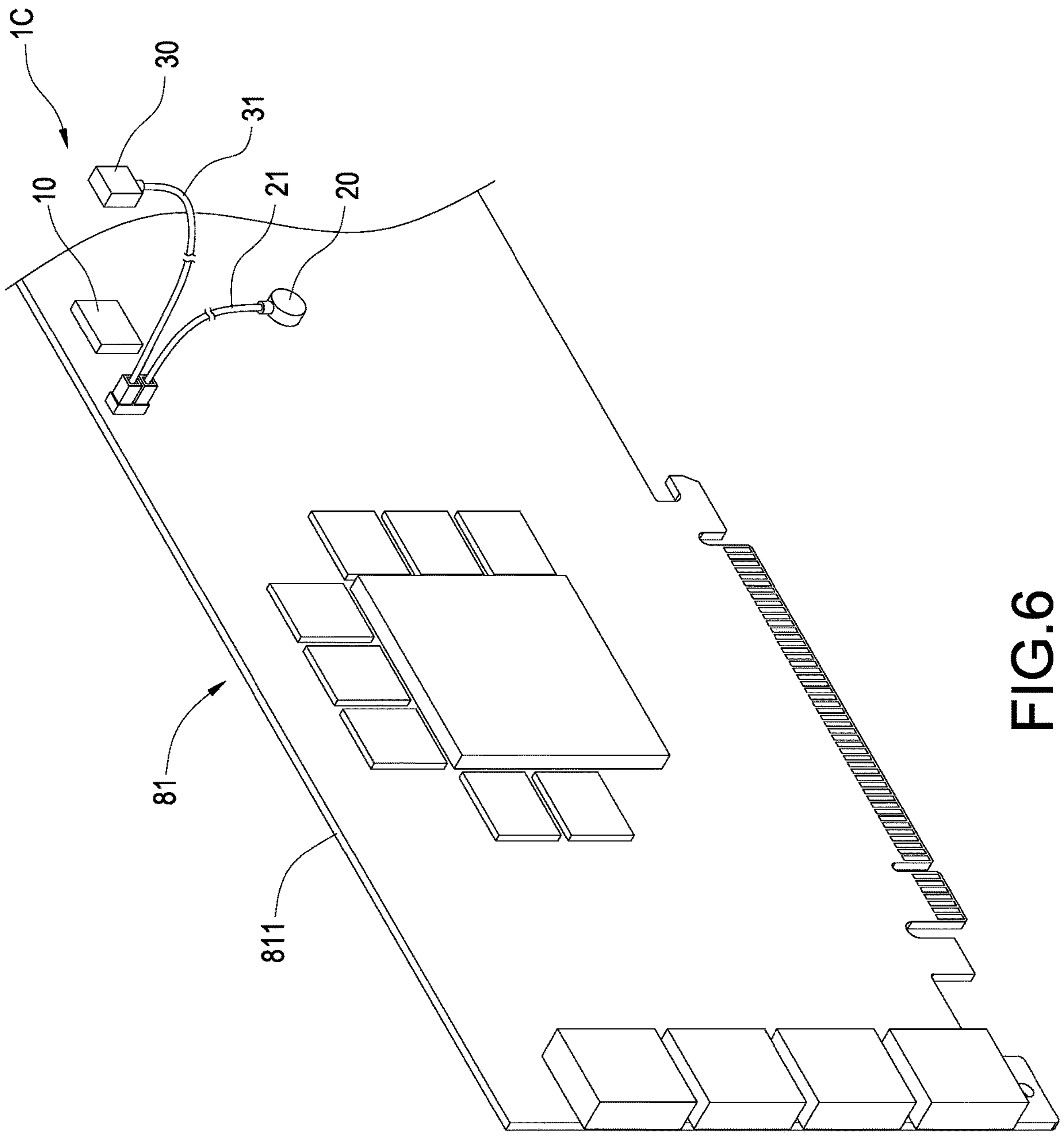

With reference to FIG. 6 for a separate active noise cancellation device 1C in accordance with an embodiment of the present disclosure, the separate active noise cancellation device 1C mainly includes an active noise cancellation controller 10, a microphone 20 and a speaker 30. The speaker 30 includes a cable 31 provided for electrically connecting the speaker 30 to the active noise cancellation controller 10, the speaker 30 and the microphone 20 are arranged separately from each other, and the number of microphones 20 and the number of speakers 30 are different.

While this disclosure has been described by means of specific embodiments, numerous modifications and variations could be made thereto by those skilled in the art without departing from the scope and spirit of this disclosure set forth in the claims.

What is claimed is:

1. A separate active noise cancellation device, installed on an electronic device, the electronic device comprising a circuit board and a noise generating source, and the separate active noise cancellation device comprising:

an active noise cancellation controller, installed on the circuit board and electrically coupled to the circuit board;

a first terminal and a second terminal formed on the circuit board;

a microphone, separately installed with respect to the active noise cancellation controller, comprising a first cable, electrically coupled to the active noise cancellation controller through the first cable connecting to the first terminal, and located around the noise generating source; and a speaker, separately installed with respect to microphone and the active noise cancellation controller, comprising a second cable, electrically coupled to the active noise cancellation controller through the second cable connecting to the second terminal, and configured to generate a noise cancelling sound to offset a noise generated by the noise generating source.

2. The separate active noise cancellation device according to claim 1, wherein the speaker is located around the noise generating source.

3. The separate active noise cancellation device according to claim 1, wherein the microphone comprises a reference microphone and an erroneous microphone.

4. The separate active noise cancellation device according to claim 1, wherein both the microphone and the speaker are multiple in number and in a same quantity.

5. The separate active noise cancellation device according to claim 1, wherein both the microphone and the speaker are multiple in number and in different quantities.

6. The separate active noise cancellation device according to claim 1, wherein the electronic device comprises a display card with the circuit board and a cooling device with the noise generating source.

7. The separate active noise cancellation device according to claim 1, wherein the electronic device is a power supply unit with the circuit board and the noise generating source.

8. The separate active noise cancellation device according to claim 1, wherein the electronic device is a host computer with the circuit board and a plurality of noise generating sources.

* * * * *